(12) United States Patent
Kopp et al.

(10) Patent No.: US 10,797,366 B2
(45) Date of Patent: Oct. 6, 2020

(54) TEMPERATURE-CONTROLLING DEVICE FOR A BATTERY MODULE, METHOD FOR MANUFACTURING SAME AND BATTERY MODULE

(71) Applicant: Robert Bosch GmbH, Stuttgart (DE)

(72) Inventors: Benjamin Kopp, Remseck am Neckar (DE); Christian Loew, Stuttgart (DE); Matthias Schaber, Berlin (DE); Steffen Benz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 16/090,322

(22) PCT Filed: Mar. 9, 2017

(86) PCT No.: PCT/EP2017/055549
§ 371 (c)(1),
(2) Date: Oct. 1, 2018

(87) PCT Pub. No.: WO2017/167563
PCT Pub. Date: Oct. 5, 2017

(65) Prior Publication Data
US 2019/0115641 A1    Apr. 18, 2019

(30) Foreign Application Priority Data

Mar. 30, 2016    (DE) .................... 10 2016 205 237

(51) Int. Cl.
*H01M 10/6556* (2014.01)
*H01M 10/655* (2014.01)
*H01M 10/6568* (2014.01)

(52) U.S. Cl.
CPC ... *H01M 10/6568* (2015.04); *H01M 10/6556* (2015.04)

(58) Field of Classification Search
None
See application file for complete search history.

(56) References Cited

U.S. PATENT DOCUMENTS

| | | |
|---|---|---|
| 2013/0014923 A1 | 1/2013 | Girmscheid et al. |
| 2014/0216702 A1 | 8/2014 | Vallee et al. |
| (Continued) | | |

FOREIGN PATENT DOCUMENTS

| | | |
|---|---|---|
| DE | 69823156 | 11/2004 |
| DE | 202012102349 | 7/2012 |
| (Continued) | | |

OTHER PUBLICATIONS

International Search Report for Application No. PCT/EP2017/055549 dated Jun. 8, 2017 (English Translation, 3 pages).

*Primary Examiner* — Yoshitoshi Takeuchi
(74) *Attorney, Agent, or Firm* — Michael Best & Friedrich LLP

(57) ABSTRACT

The invention relates to a temperature-controlling device for a battery module, having a flow space (4) which has a multiplicity of spacer elements (11) and is essentially closed. The spacer elements (11) are arranged within the flow space (4) and the temperature-controlling device (3) further has a flow deflection unit (15) which is arranged within the flow space (4) and has a longitudinal direction (16) extending along the flow deflection unit (15) from a first end (24) to a second end (25) of said flow deflection unit (15). The flow deflection unit (15) forms a first side face (17) and a second side face (18) which sides are arranged in the longitudinal direction (16) on opposite sides of the flow deflection unit (15), and wherein at least portions of the first side face (17) and the second side face (18) are arranged directly adjacent to a spacer element (11, 111, 112).

19 Claims, 6 Drawing Sheets

(56) References Cited

U.S. PATENT DOCUMENTS

2014/0272496 A1    9/2014   Han et al.
2015/0053372 A1    2/2015   Seitz et al.

FOREIGN PATENT DOCUMENTS

| | | | | |
|---|---|---|---|---|
| DE | 102013200859 | | 8/2013 | |
| DE | 102013219517 | | 4/2014 | |
| DE | 102012023316 | | 5/2014 | |
| DE | 102014102954 | | 9/2014 | |
| DE | 102013216523 | | 2/2015 | |
| DE | 102014217546 | | 3/2016 | |
| EP | 2453515 | | 5/2012 | |
| KR | 2014/0026961 | * | 3/2014 | ............. B60K 11/00 |
| KR | 20140026961 | | 3/2014 | |

* cited by examiner

TEMPERATURE-CONTROLLING DEVICE FOR A BATTERY MODULE, METHOD FOR MANUFACTURING SAME AND BATTERY MODULE

BACKGROUND OF THE INVENTION

The invention is based on a temperature-controlling device for a battery module. The subject of the present invention is also a method for manufacturing a temperature-controlling device, and a battery module with such a temperature-controlling device.

During operation, because of their electrical resistance on a current flow, battery cells produce heat which must be dissipated in order to avoid high temperatures and maintain the performance of the battery cells. To dissipate heat from battery cells which are preferably connected into a battery module, in particular a temperature-controlling device is arranged on the battery module, wherein a tempering fluid flows through said device; the tempering fluid is introduced into a flow chamber of the temperature-controlling device via an inlet and discharged from the flow chamber via an outlet. The heat from the battery cells is transferred via the temperature-controlling device to the tempering fluid flowing in the flow chamber. For reliable cooling of the battery cells, the tempering fluid must flow evenly through the entire flow chamber with as little pressure loss as possible between the inlet and the outlet, without dead zones occurring with a loss of flow speed.

The prior art, for example DE 10 2013 200 859 A1, discloses a plate assembly for a heat exchanger of a battery assembly. The plate assembly has at least two substantially planar elements, preferably made of plastic and forming an intermediate space, wherein the at least two planar elements are spaced apart from each other by spacers, forming the intermediate space. A coolant can flow through the intermediate space. Furthermore, the plate assembly comprises a wall inside the intermediate space which, together with the spacers, determines the flow field of the coolant inside the intermediate space. Furthermore, the planar elements of the plate assembly have openings for the inflow and outflow of coolant.

Also, EP 2 453 515 A1 describes a cooling device for a battery of an electric vehicle. The cooling device comprises a cooling plate arrangement with a first metal plate and a second metal plate which are connected together by means of a roll-bonding process. The first metal plate and the second metal plate are connected together to form coolant channels which are configured as cavities between the two metal plates, wherein the first metal plate and the second metal plate are spaced apart from each other in the region of the coolant channels.

DE 10 2014 102 954 A1 discloses a microchannel cooling rib for a battery module which comprises a plurality of metal plate assemblies defining cooling channels. Furthermore, the microchannel cooling rib has an inlet part for introduction of a liquid coolant into the plurality of coolant channels, and an outlet part through which the coolant leaves the plurality of cooling channels.

DE 10 2012 023 316 A1 discloses a temperature-controlling device with a substantially cuboid base body which is configured so as to be thermally conductively connectable to energy storage units, and with at least one fluid channel which is guided at least in portions through the base body in order to conduct a tempering fluid. The temperature-controlling device furthermore comprises several depressions and/or protrusions arranged on a casing surface of the base body.

SUMMARY OF THE INVENTION

The temperature-controlling device of a battery module with the features of the independent claim has the advantage that a tempering fluid flowing through a flow chamber of the temperature-controlling device can be guided by means of a flow deflection unit arranged inside the flow chamber and a plurality of spacer elements, such that a more even flow of the tempering fluid is possible with reduced pressure loss inside the flow chamber in comparison with temperature-controlling devices known from the prior art, and at the same time the occurrence of dead zones can be reduced. Furthermore, a temperature-controlling device according to the invention, in comparison with temperature-controlling devices forming defined cooling channels, has the advantage that because of the larger flow chamber, the tempering fluid can flow through the temperature-controlling device over a larger surface area, and the spacer elements arranged in the flow chamber ensure a more turbulent flow with a higher Reynolds' number, whereby the heat transport properties may be further improved and hence heat dissipated more efficiently. In this way, it is possible to reliably cool battery cells of a battery module.

According to the invention, a temperature-controlling device for a battery module is provided. The temperature-controlling device has a substantially closed flow chamber with a plurality of spacer elements. Here, the spacer elements are arranged inside the flow chamber. Furthermore, the temperature-controlling device comprises a flow deflection unit arranged inside the flow chamber. The flow deflection unit has a first end and a second end, wherein the flow deflection unit has a longitudinal direction extending along the flow deflection unit from a first end to a second end. Furthermore, the flow deflection unit forms a first side face and a second side face which are arranged in the longitudinal direction on opposite sides of the flow deflection unit. At least portions of the first side face and the second side face are arranged directly adjacent to a spacer element.

The measures listed in the dependent claims allow advantageous refinements and improvements of the device specified in the independent claim or the method given in the independent claim.

A substantially closed flow chamber means that, except for ports for inlet or outlet of a tempering fluid into or out of the flow chamber, the flow chamber is closed fluid-tightly. In particular, the flow chamber is closed tightly for the tempering fluid.

It is suitable if the temperature-controlling device comprises a first tempering body and a second tempering body which are each formed substantially from a planar base body. Here, the first tempering body has a first surface and the second tempering body has a second surface which are spaced apart from each other by means of the plurality of spacer elements. In this way, the first tempering body and the second tempering body form the flow chamber of the temperature-controlling device. In other words, the first surface and the second surface delimit the flow chamber. In particular, the first surface of the first tempering body, formed substantially from a planar base body, and the second surface of the second tempering body, formed substantially from a planar base body, are arranged parallel to each other. The spacer elements here preferably each contact the first surface and/or the second surface. In particular, the spacer elements are each connected to the first surface and/or the second surface.

This has the advantage that, due to the planar form of the two tempering bodies, no surfaces are formed which cause flow deflections increasing the pressure loss, and by means of the arrangement of spacer elements in the flow chamber, nonetheless a defined flow guidance is possible with increased turbulence properties. Furthermore, the planar form of the tempering bodies offers the advantage of creating a structure which is mechanically stable during operation.

The phrase "a substantially planar base body of a tempering body" means that the tempering body, without the spacer elements arranged in contact therewith and/or without spacer elements connected thereto, is formed such that the two largest side faces of the base body lying opposite each other are formed flat. In particular, the base body is formed as a flat plate or flat panel. In particular, one of the tempering bodies may also be rounded in the edge regions or configured such that the two tempering bodies can close the flow chamber, wherein however it is also possible to close the flow chamber with at least one further housing wall connected to the two tempering bodies.

It is furthermore suitable if the first tempering body and/or the second tempering body is formed from a metallic material. In particular, the metallic material is aluminum or an aluminum-containing alloy. Thus with such a tempering body, because of the high thermal conductivity of the metallic material, a good heat transport through the tempering body can be achieved; in particular, a good heat dissipation is possible from the battery cells of a battery module arranged on the tempering body. Furthermore, it may also be suitable to make the temperature-controlling device from a plastic, in particular with an advantageous thermal conductivity, in order to reduce the weight of the tempering body.

It is advantageous if the flow chamber forms a first region and a second region, wherein at least one spacer element, preferably a plurality of spacer elements, is arranged inside the first region of the flow chamber and inside the second region of the flow chamber. Here, a first port and/or a second port is arranged between the first region and the second region of the flow chamber. The first port is configured for inlet of tempering fluid into the flow chamber. The second port is configured for outlet of tempering fluid from the flow chamber. Thus it is possible to introduce tempering fluid at a position of the flow chamber and evacuate this at a position of the flow chamber such that a more even distribution of the tempering fluid in the entire flow chamber is possible, since the first port and/or the second port are arranged between the first region and the second region.

It may furthermore be advantageous if the first port is arranged adjacent to the first side face and the second port is arranged adjacent to the second side face. In other words, this means that the first port and the second port are arranged between the first region and the second region, and furthermore the flow deflection unit is arranged at least partially running between the first port and the second port. Thus, by such an arrangement of the first port and second port, a flow may be imposed on the tempering fluid which covers the entire flow chamber. Furthermore, in this way, dead zones of the flow in which the flow speed tends towards zero can be reduced or even prevented since, in the first region and in the second region of the flow chamber, the tempering fluid flows along the first side face and along the second side face of the flow deflection unit in order to travel from the first port to the second port. Here, the flow is deflected by the spacer elements arranged in the flow chamber and adjacent to the first face and the second face such that the tempering fluid can flow more evenly through all regions of the flow chamber.

According to an advantageous concept of the invention, the first tempering body and/or the second tempering body contains the plurality of spacer elements. Here, the spacer elements protrude from the above-mentioned planar base body of the respective tempering body, in particular the spacer elements protrude from the first surface or the second surface. Thus it is easy to manufacture the temperature-controlling device since the spacer elements are already arranged on at least one tempering body.

It should be pointed out here that it is possible to arrange the entire plurality of spacer elements on just one tempering body. Furthermore, it is also possible to arrange spacer elements on the first tempering body and the second tempering body.

The spacer elements may here be produced independently of the tempering body, and after production connected to the planar base body of the tempering body via a suitable joining process. The tempering body may here contain the spacer elements, which in particular is possible with a suitable forming process of a planar base body of the respective tempering body, or during joining of the two tempering bodies, in particular by means of a roll-bonding process.

Preferably, the spacer elements are arranged in regular structures relative to each other. Here, in each case, three directly adjacent spacer elements form an isosceles triangle. It is stated here that the three corner points forming such an isosceles triangle are each the surface center points of a cross-sectional face of three adjacent spacer elements, wherein the cross-sectional face is parallel to the first surface and/or the second surface of the base body of the respective tempering body, and all three cross-sectional faces of the spacer elements lie in the same plane. Here, it is preferred if a shortest side of the isosceles triangle preferably has a length between 20 mm and 40 mm, furthermore preferably a length between 25 mm and 35 mm. In particular, a shortest side of the isosceles triangle has a length of 29 mm. Thus by the arrangement in a regular structure, it is possible for the spacer elements also to advantageously influence the mechanical stability of the temperature-controlling device, as well as establish the flow guidance in a desired fashion. In particular, it is thus possible to restrict the yield strength preferably to 2% to 10%, furthermore preferably 3% to 7%. In particular, the yield strength may be limited to 4% to 6%. Thus, the temperature-controlling device has a high mechanical stability against the temperature fluctuations which occur between heat dissipation in operation and a cooled rest state of a battery module, whereby deformations can be limited to an acceptable value.

Furthermore, it is preferred if the spacer elements, arranged inside the flow chamber in a plane parallel to the first surface and/or the second surface, have a circular, quadrilateral, round, oval, elliptical or rectangular cross-sectional face. Here, in particular, circular cross-sectional faces preferably have a diameter from 10 mm to 20 mm, and furthermore preferably a diameter from 15 mm to 17 mm. In this way, the spacer elements arranged inside the flow chamber are configured such that they allow a desired distribution of flow of tempering fluid inside the flow chamber and furthermore may ensure a mechanical stability of the temperature-controlling device.

It is advantageous if the temperature-controlling device has an asymmetrical form. The phrase "asymmetrical form" in particular means that a cross-sectional face of the flow deflection unit parallel to the first surface and/or the second surface of the respective tempering body has an asymmetrical form. Furthermore, this cross-sectional face may have a different form in the first region and the second region of the flow chamber, wherein the cross-sectional face in the first region and the cross-sectional face in the second region are in particular formed asymmetrically relative to each other. Furthermore, in particular, the cross-sectional face in the first region and/or in the second region may be configured so as to be asymmetrical, which means that the cross-sectional face in the first region and/or in the second region has at least two rectilinear axes of symmetry which are not arranged parallel to each other.

Here it is advantageous if the cross-sectional face just described in the first region has a first portion and a second portion, wherein the first portion and the second portion are arranged in an L shape to each other, in particular arranged in a rounded L shape to each other. Here, the phrase "arranged in an L shape to each other" means that the cross-sectional face of the first region substantially has a first axis of symmetry, and the cross-sectional face of the second region substantially has a second axis of symmetry, wherein the first axis of symmetry and the second axis of symmetry are arranged at right angles to each other. The transitional region between the first region and the second region of the cross-sectional face may here be rounded, so that the cross-sectional face is configured as a rounded L shape.

Furthermore it is advantageous if the cross-sectional face just described in the second region has a first portion which is I-shaped. Furthermore, it may be advantageous if the cross-sectional face in the second region has a second portion, and the first portion and the second portion are arranged in a T shape to each other. The term "I-shaped" means that the cross-sectional face of the first region substantially has one axis of symmetry. The phrase "arranged in a T shape to each other" means that the cross-sectional face of the first region has substantially a first axis of symmetry, and the cross-sectional face of the second region has substantially a second axis of symmetry, wherein the first axis of symmetry and the second axis of symmetry are arranged at right angles to each other, and the axis of symmetry of the first region intersects the cross-sectional face of the second region centrally.

According to one embodiment of the invention, the first surface of the first tempering element and the second surface of the second tempering element are arranged spaced apart from each other. Here, the spacing preferably has a value of 1 mm to 5 mm, furthermore preferably from 2 mm to 3 mm. In particular, the spacing has a value of 2.5 mm. By means of a spacing with such a value, a volume flow can be guided inside the flow chamber which can ensure adequate heat dissipation, and at the same time, with such a value of the spacing, the stability of the temperature-controlling device is maintained.

In particular, it is advantageous if a surface of the temperature-controlling device facing away from the flow chamber is formed flat. In particular, the surface of the temperature-controlling device facing away from the flow chamber is a surface of the first tempering body and/or the second tempering body which is arranged opposite the first surface or the second surface on the planar base body of the respective tempering body. This has the advantage that battery cells of a battery module can be arranged thermally conductively on this flat surface, so that as large a heat transmission surface as possible can be achieved by the contact of the battery cells with the flat surface, and hence an efficient heat dissipation is possible.

The invention furthermore concerns a battery module with a temperature-controlling device as described above which may be refined with all the possibilities outlined and accordingly may have all said advantages. Here, at least one battery cell of the battery module is arranged on a surface of the temperature-controlling device facing away from the flow chamber.

The battery module according to the invention is suitable for batteries in mobile use, in particular in electric vehicles and electric bikes, and for batteries for use in the stationary sector.

Furthermore, a method is proposed for manufacturing a temperature-controlling body as described above. Here, in a first step, the spacer elements are arranged on at least one of the tempering bodies, or a tempering body is configured such that the tempering body contains the spacer elements.

In a second step, the flow deflection unit is arranged on one of the tempering bodies, or a tempering body is configured such that it contains the flow deflection unit.

In a third step, the first tempering body and the second tempering body are connected together forming a substantially closed flow chamber. The connecting process in particular is structured as a roll-bonding process, wherein during the roll-bonding process, the tempering body is formed such that this contains the spacer elements and/or the flow deflection unit.

BRIEF DESCRIPTION OF THE DRAWINGS

Exemplary embodiments of the invention are shown in the drawings and explained in more detail in the description below.

The drawings show.

DETAILED DESCRIPTION

Figure 1:
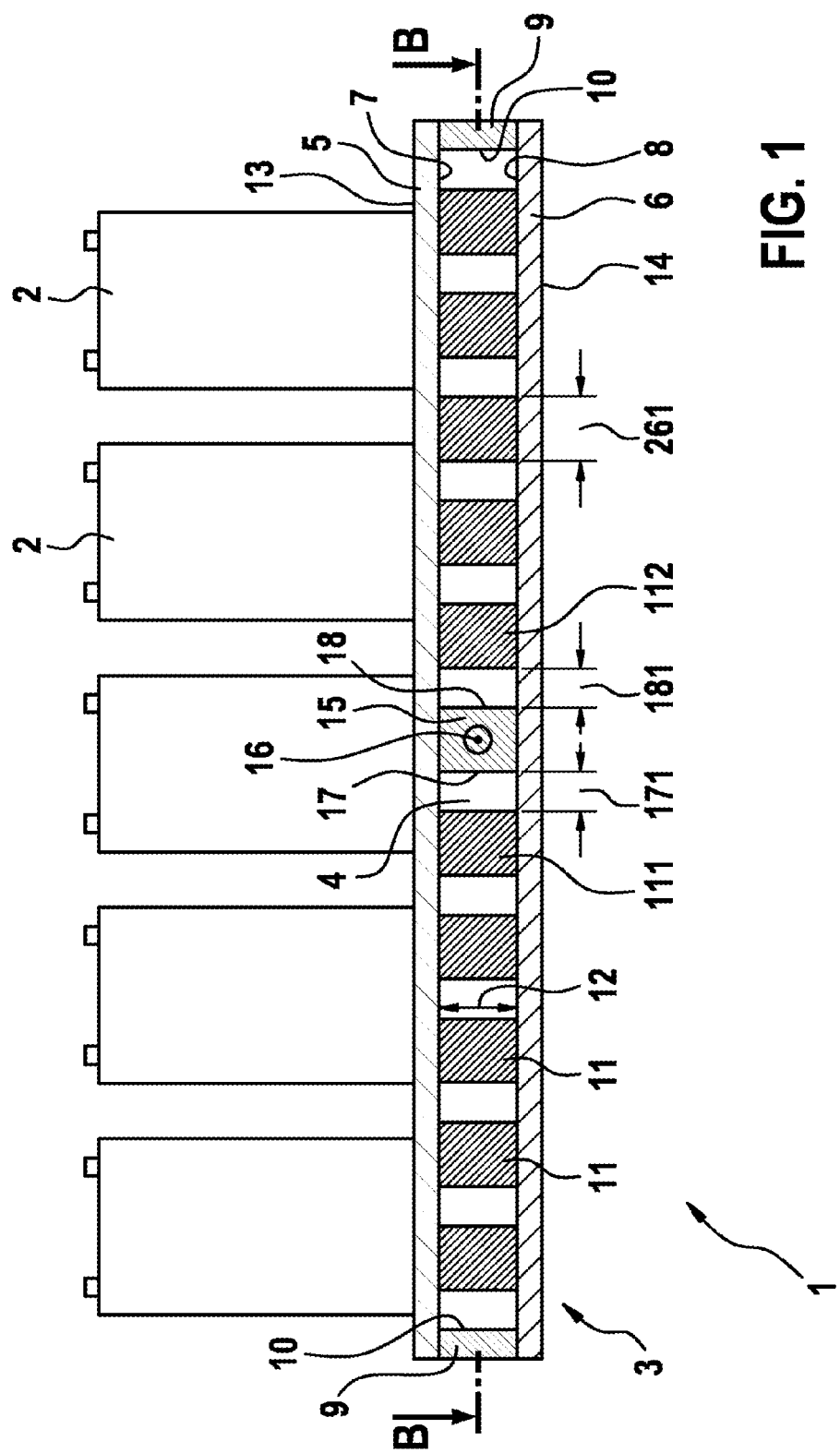
FIG. 1 diagrammatically, a cross-section through a battery module, perpendicularly to a longitudinal direction of the flow deflection unit, of a first embodiment of the temperature-controlling device according to the invention, FIG. 2 a cross-section, parallel to a longitudinal direction of the flow deflection unit, of a first embodiment of the temperature-controlling device according to the invention, FIG. 3 a cross-section, parallel to a longitudinal direction of the flow deflection unit, of a second embodiment of the temperature-controlling device according to the invention, FIG. 4 a cross-section, parallel to a longitudinal direction of the flow deflection unit, of a third embodiment of the temperature-controlling device according to the invention, FIG. 5 a second tempering body of the temperature-controlling device in a perspective view, FIG. 6 a port of the temperature-controlling device in a first perspective view, and FIG. 7 a port of the temperature-controlling device in a second perspective view.

FIG. 1 shows a cross-section, perpendicularly to a longitudinal direction of the flow deflection unit, through a battery module 1 of a first embodiment of the temperature-controlling device according to the invention.

The battery module 1 has a plurality of battery cells 2, wherein the battery module 1 shown in FIG. 1 comprises in particular five battery cells 2. Furthermore, the battery module 1 has a temperature-controlling device 3 according to the invention. The battery cells 2 are arranged on the temperature-controlling device 3, wherein the battery cells 2 are arranged on the temperature-controlling device 3 such that heat from the battery cells 2 can be dissipated from the battery cells 2 by means of the temperature-controlling device 3.

The temperature-controlling device 3 has a substantially closed flow chamber 4. The first embodiment of the temperature-controlling device 3 according to the invention, shown in FIG. 1, has a first tempering body 5 and a second tempering body 6. The first tempering body 5 has a first surface 7. The second tempering body 6 has a second surface 8. Furthermore, the temperature-controlling device 3 has further housing walls 9 with inner surfaces 10. In the first exemplary embodiment of the temperature-controlling device 3 shown in FIG. 1, the first tempering body 5, the second tempering body 6 and the further housing walls 9 form the flow chamber 4. In particular, the first surface 7, the second surface 8 and the inner surfaces 10 delimit the flow chamber 4 of the temperature-controlling device 3. The flow chamber 4 is thus substantially closed, in particular closed substantially fluid-tightly, by the first tempering body 5, the second tempering body 6 and the further housing walls 9. Furthermore, in particular the first surface 7 and the second surface 8 are arranged parallel to each other. The flow chamber 4, as will be described below, has ports for inlet and outlet of tempering fluid into and from the flow chamber 4, and is closed substantially fluid-tightly.

It is furthermore evident from FIG. 1 that the first tempering body 5 and the second tempering body 6 are formed substantially from a planar base body. In particular, the surface 7 and the side face 13 lying opposite the first surface 7 are formed flat, wherein the first surface 7 and the side face 13 are in particular parallel to each other. Furthermore, in particular the second surface 8 and the side face 14 lying opposite the second surface 8 are formed flat, wherein the second surface 8 and the side face 14 are in particular arranged parallel to each other.

The temperature-controlling device 3 furthermore has a plurality of spacer elements 11 which are arranged inside the flow chamber 4. The first surface 7 of the first tempering body 5, and the second surface 8 of the second tempering body 6, are spaced apart from each other by a spacing 12 by means of a plurality of spacer elements 11. The spacer elements 11 each contact the first surface 7 and the second surface 8. Furthermore, it is also conceivable that the spacer elements 11 are each connected to the first surface 7 and/or the second surface 8. Furthermore, a spacer element 11 may also be connected to just one surface 7 or 8.

The temperature-controlling device 3 has a flow deflection unit 15 arranged inside the flow chamber 4. The flow deflection unit 15 has a longitudinal direction extending along the flow deflection unit 15, which direction in FIG. 1 stands perpendicularly to the drawing plane. In other words, this means that the cross-section of the battery module 1 shown in FIG. 1 is perpendicular to the longitudinal direction 16 of the flow deflection unit 15.

Furthermore, the flow deflection unit 15 arranged inside the flow chamber 4 forms a first side face 17 and a second side face 18. The first side face 17 and the second side face 18 are arranged on opposite sides of the flow deflection unit 15. In particular, the first side face 17 and the second side face 18 are arranged on opposite sides of the flow deflection unit 15 in the longitudinal direction 16. In particular, in the exemplary embodiment of the temperature-controlling device 3 shown in FIG. 1, the mutually opposing side faces 17 and 18 are arranged perpendicularly to the first surface 7 and the second surface 8.

The first side face 17 is here arranged directly adjacent to a first spacer element 111. Furthermore, the second side face 18 is arranged directly adjacent to a second spacer element 112. As evident from FIG. 1, the term "directly adjacent" means that the respective spacer element 111 or 112 is arranged on the same side of the longitudinal direction 16 as the first side face 17 or second side face 18 respectively. In other words, this means that the flow deflection unit 15 is arranged between the first spacer element 111 which is directly adjacent to the first side face 17, and the second spacer element 112 which is directly adjacent to the second side face 18.

The distance 171 shown in FIG. 1 between the first side face 17 and a first spacer element 111 directly adjacent to the first side face 17 preferably has a value of 5 mm to 25 mm, furthermore preferably a value of 10 mm to 20 mm. In particular, the distance 171 has a value of 15 mm.

The distance 181 shown in FIG. 1 between the second side face 18 and a second spacer element 112 directly adjacent to the second side face 18 preferably has a value of 5 mm to 25 mm, furthermore preferably a value of 10 mm to 20 mm. In particular, the distance 181 has a value of 15 mm.

In particular, the ratio of the cross-sectional area of the flow chamber 4, through which tempering fluid may flow and which is shown in FIG. 1, to the sum of all cross-sectional areas of all spacer elements 11 which lie within a section, for a section through their center point shown in FIG. 1, has a value of preferably between 0.75 and 1.25, furthermore preferably between 0.85 and 1.15. In particular, the ratio has a value of 1. Thus a more even through-flow in the flow chamber 4 is possible with little pressure loss.

It is furthermore evident from FIG. 1 that the surface facing away from the flow chamber 4, also known as a side face 13, is also formed flat. The battery cells 2 of the battery module 1 are arranged on the surface or side face 13. The battery cells 2 are preferably arranged such that the battery cells 2 are thermally conductively connected to the temperature-controlling device 3, in particular the tempering body 5.

Figure 2:
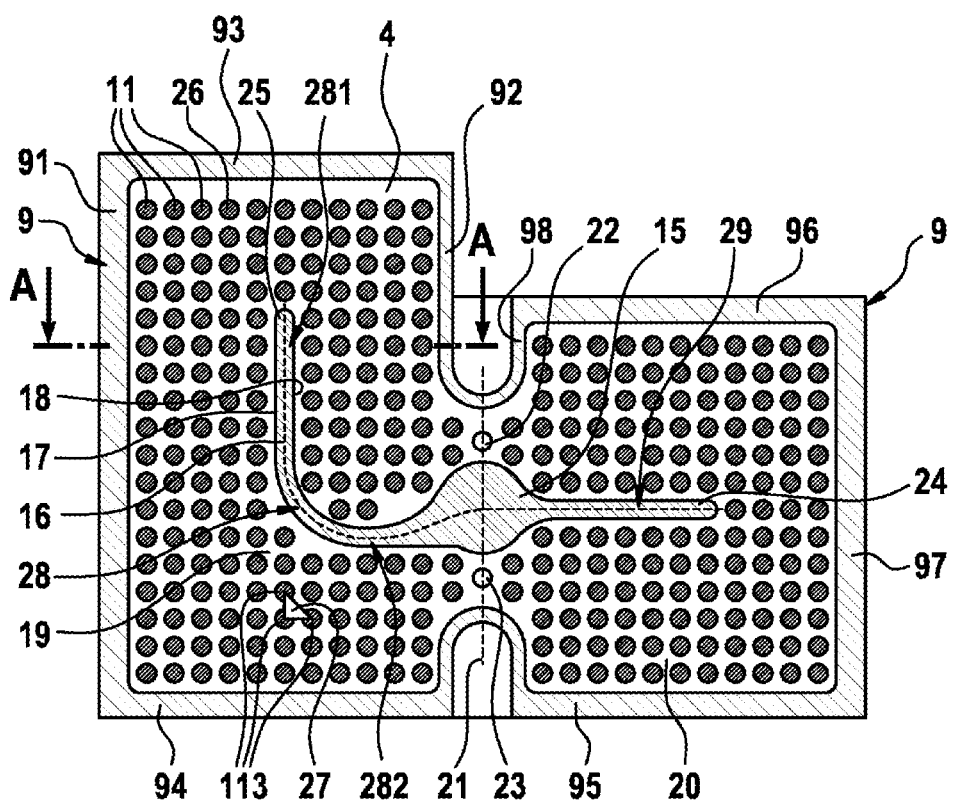

FIG. 2 shows a cross-section of the first embodiment of the temperature-controlling device 3 according to the invention, arranged parallel to a longitudinal direction of the flow deflection unit. The cross-sectional face shown is in particular also arranged parallel to the first surface 7 or the second surface 8.

It is pointed out here firstly that FIG. 1 shows a cross-section through the battery module 1, and in particular the temperature-controlling device 3 according to the section A-A shown in FIG. 2. FIG. 2 shows a cross-section through the temperature-controlling device 3 according to section B-B in FIG. 1. Since FIG. 2 shows a cross-section through the flow chamber 4, the first tempering body 5 and the second tempering body 6 cannot be seen here, while the further housing walls 9 can be seen in FIG. 2.

Furthermore, FIG. 2 shows the spacer elements 11 which are arranged inside the flow chamber 4 through which a tempering fluid can flow, and also shows the flow deflection unit 15.

The temperature-controlling device 3 forms a first region 19 and a second region 20. FIG. 2 shows that a plurality of spacer elements 11 is arranged in both the first region 19 and in the second region 20. The first region 19 of the flow chamber 4 and the second region 20 of the flow chamber 4 are delimited from each other for example by the dotted line 21, wherein this line 21 serves merely to illustrate the delimitation of the first region 19 and second region 20 from each other and does not constitute a physical separation.

Between the first region 19 and the second region 20, a first port 22 is arranged which serves for the inlet of tempering fluid into the flow chamber 4. Between the first region 19 and the second region 20, a second port 23 is arranged which serves for the outflow of tempering fluid from the flow chamber 4. The arrangement between the first region 19 and second region 20 may, as shown in FIG. 2, mean that the separating line 21 delimiting the first region 19 and second region 20 runs through the respective port 22 or 23.

FIG. 2 furthermore shows a longitudinal direction 16 of the flow deflection unit 15 which is drawn in dotted lines, and the first side face 17 and second side face 18. It is evident from FIG. 2 that the flow deflection unit 15 has a first end 24 and a second end 25, wherein the longitudinal direction 16 extends from the first end 24 to the second end 25 along the flow deflection unit 15. It is furthermore evident from FIG. 2 that the first port 22 is arranged directly adjacent to the second side face 18, and the second port 23 is arranged directly adjacent to the first side face 17, so that the flow deflection unit 15 runs between the first port 22 and the second port 23.

FIG. 2 furthermore shows that in the longitudinal direction 16, the flow deflection unit 15 has an enlargement of a cross-sectional area, perpendicularly to the longitudinal direction 16, in the transitional region between the first region 19 and the second region 20, so as in particular to be able to distribute the inflowing tempering fluid more evenly over the first region 19 and second region 20, and in particular to discharge the outflow of tempering fluid better.

The spacer elements 11 shown have circular cross-sectional faces 26, wherein the spacer elements 11 shown in FIG. 2 in particular each have a cross-sectional face 26 with a diameter of 50 mm, wherein for clarification, the diameter is marked with reference sign 261 in FIG. 1.

FIG. 2 furthermore shows that the spacer elements 11 are arranged in regular structures to each other. Thus three directly adjacent spacer elements 113 in each case form an isosceles triangle 27 which, in the first exemplary embodiment of the temperature-controlling device 3 shown in FIG. 2, is also an equilateral triangle 27. The shortest side of this triangle 27 has a length of 29 mm.

The flow deflection unit 15 has an asymmetrical form. In particular, the cross-sectional face 28 in the first region 19 of the flow chamber 4 is asymmetrical in relation to the cross-sectional face 29 in the second region 20 of the flow chamber 4.

The cross-sectional face 28 in the first region 19 has an asymmetrical form. In particular, the cross-sectional face 28 has a first portion 281 and the second portion 282 which are arranged substantially in an L shape to each other. The transitional region between the first portion 281 to the second portion 282 is rounded.

The cross-sectional face 29 in the second region 20 has a symmetrical form. In particular, the cross-sectional face is formed in an I shape, wherein the cross-sectional face is symmetrical in particular relative to the longitudinal direction 16 shown.

It is evident from FIG. 2 in particular that at most five spacer elements 11 are arranged in the first portion 281 between the first side face 17 of the flow deflection unit 15 and a first side wall 91 on the shortest connection. In particular, at most five spacer elements 11 are arranged in the first portion 281 between the second side face 18 of the flow deflection unit 15 and a second housing wall 92 on the shortest connection. Furthermore, four spacer elements 11 are arranged between the second end 25 and a third housing wall 93 along the shortest connection between the second end 25 and the third housing wall 93.

In particular, it is clear from FIG. 2 that at most five spacer elements 11 are arranged in the second portion 282 between the first side face 17 and a fourth housing wall 94 on the shortest connection.

It is evident from FIG. 2 in particular that at most six spacer elements 11 are arranged in the second region of the flow chamber 4 between the first side face 17 of the flow deflection unit 15 and a fifth housing wall 95. Furthermore, it is evident from FIG. 2 in particular that at most six spacer elements 11 are arranged in the second region of the flow chamber 4 between the second side face 18 and a sixth housing wall 96 on the shortest connection.

It is also evident in particular FIG. 2 that four spacer elements 11 are arranged in the second region of the flow chamber 4 between the first end 24 and a seventh housing wall 97 along the shortest connection between the first end 24 and the seventh housing wall 97.

It should be pointed out here that, in particular in the four paragraphs above, the word "between" always means a shortest connection between the flow deflection unit 15 and a housing wall 9.

Figure 3:
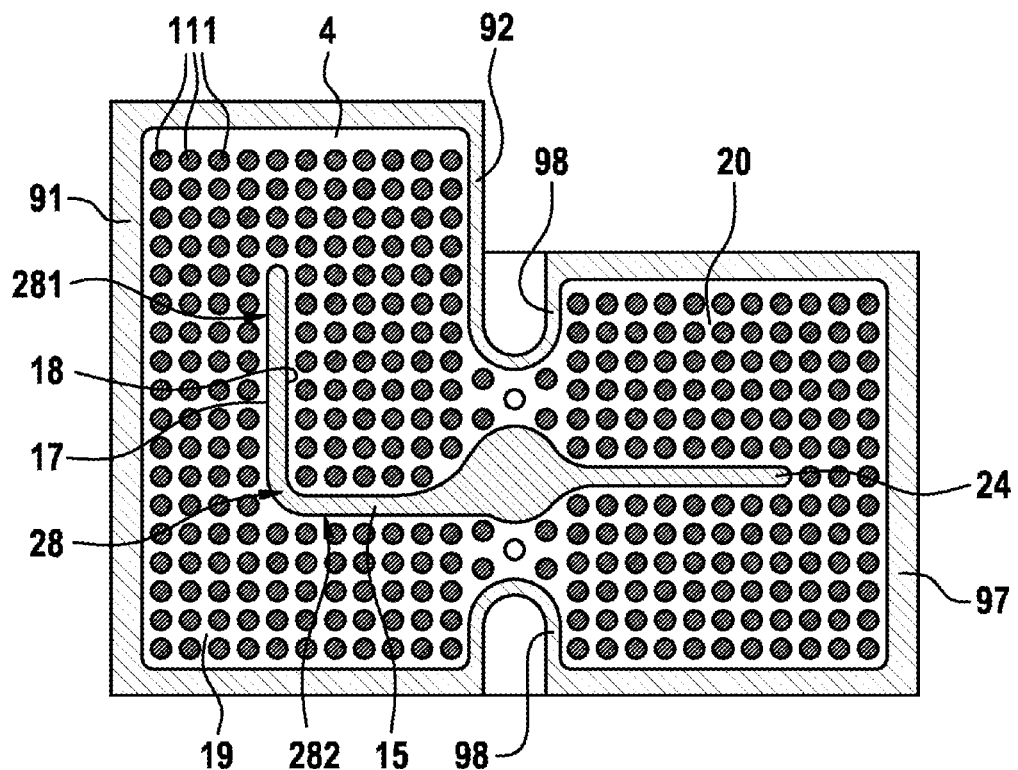

FIG. 3 shows a cross-section, parallel to a longitudinal direction of the flow deflection unit, of a second exemplary embodiment of the temperature-controlling device 3 according to the invention.

The temperature-controlling device 3 according to a second embodiment shown in FIG. 3 differs from the temperature-controlling device 3 shown in FIG. 2 in the formation of the first region 19 of the flow chamber 4 and the second region 20 of the flow chamber 4.

The cross-sectional face 28 in the first region 19 furthermore has an asymmetrical form. The first portion 281 and the second portion 282 are arranged in an L shape to each other, wherein the transitional region between the first portion 281 and the second portion 282 is not rounded, in contrast to the first exemplary embodiment shown in FIG. 2.

Furthermore, the second embodiment of a temperature-controlling device according to the invention differs from the first embodiment in that at most four spacer elements 11 are arranged between the first side face 17 of the flow deflection unit 15 in the first portion 281 and the first housing wall 91 on the shortest connection, and furthermore at most six spacer elements 11 are arranged between the second side face 18 of the flow deflection unit 15 in the first portion 281 and the second housing wall 92 on the shortest connection.

It is pointed out here that, because the transitional region between the first portion 281 and the second portion 282 is not rounded, the number of spacer elements directly adjacent to the first side face 17 or second side face 18 of the flow deflection unit 15 changes in comparison with the first exemplary embodiment.

In the second region 20 of the flow chamber 4, the second embodiment shown in FIG. 3 differs from the first embodiment in that only three spacer elements 11 instead of four spacer elements 11 are arranged between the first end 24 and the seventh housing wall 97.

Figure 4:
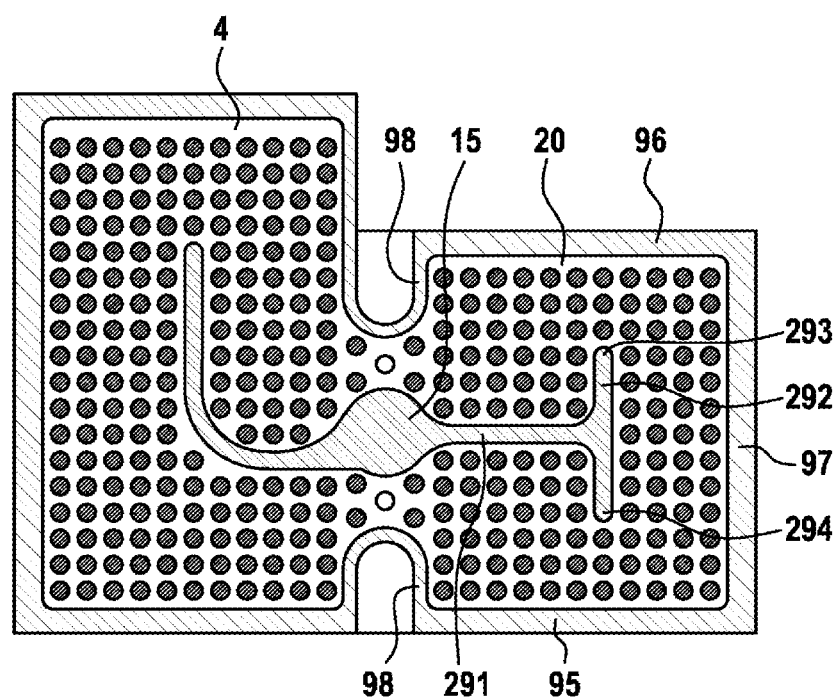

FIG. 4 shows a cross-section, parallel to a longitudinal direction of the flow deflection unit, of a third embodiment of the temperature-controlling device 3.

The third embodiment of a temperature-controlling device 3 according to the invention, shown in FIG. 4, differs from the first embodiment, shown in FIG. 2, in the formation of the second region 20 of the flow chamber 4.

The flow deflection unit 15 is here formed in a T shape. The flow deflection unit 15 in the second region 20 has a first portion 291 and a second portion 292. The second portion 292 has a first end 293 and a second end 294. The flow deflection unit 15 is here configured such that the axis of symmetry of the first portion 291 and the axis of symmetry of the second portion 292 are arranged perpendicularly to each other, wherein the axis of symmetry of the first portion 291 intersects the axis of symmetry of the second portion 292 between the first end 293 and the second end 294.

In particular, at most four spacer elements 11 are arranged between the second portion 292 and the seventh housing wall 97 on the shortest connection. Furthermore, at most three spacer elements 11 are arranged between the first end 293 and the sixth housing wall 96 on the shortest connection. Furthermore, at most three spacer elements 11 are arranged between the second end 294 and the fifth housing wall 95 on the shortest connection.

The common feature of the embodiment shown in FIGS. 2 to 4 is that at most eleven spacer elements 11 are arranged between the first housing wall 91 and the second housing wall 92 on the shortest connection. Furthermore, at most eighteen spacer elements 11 are arranged between the third housing wall 93 and the fourth housing wall 94 on the shortest connection. Furthermore, at most thirteen spacer elements 11 are arranged between the fifth housing wall 95 and the sixth housing wall 96 on the shortest connection. At most eleven spacer elements 11 are arranged between the seventh housing wall 97 and an eighth housing wall 98 on the shortest connection. Here, this maximum number of spacer elements 11 arranged between two housing walls 9 is reached when the flow deflection unit 15 is not arranged running between the respective housing walls 9.

Figure 5:
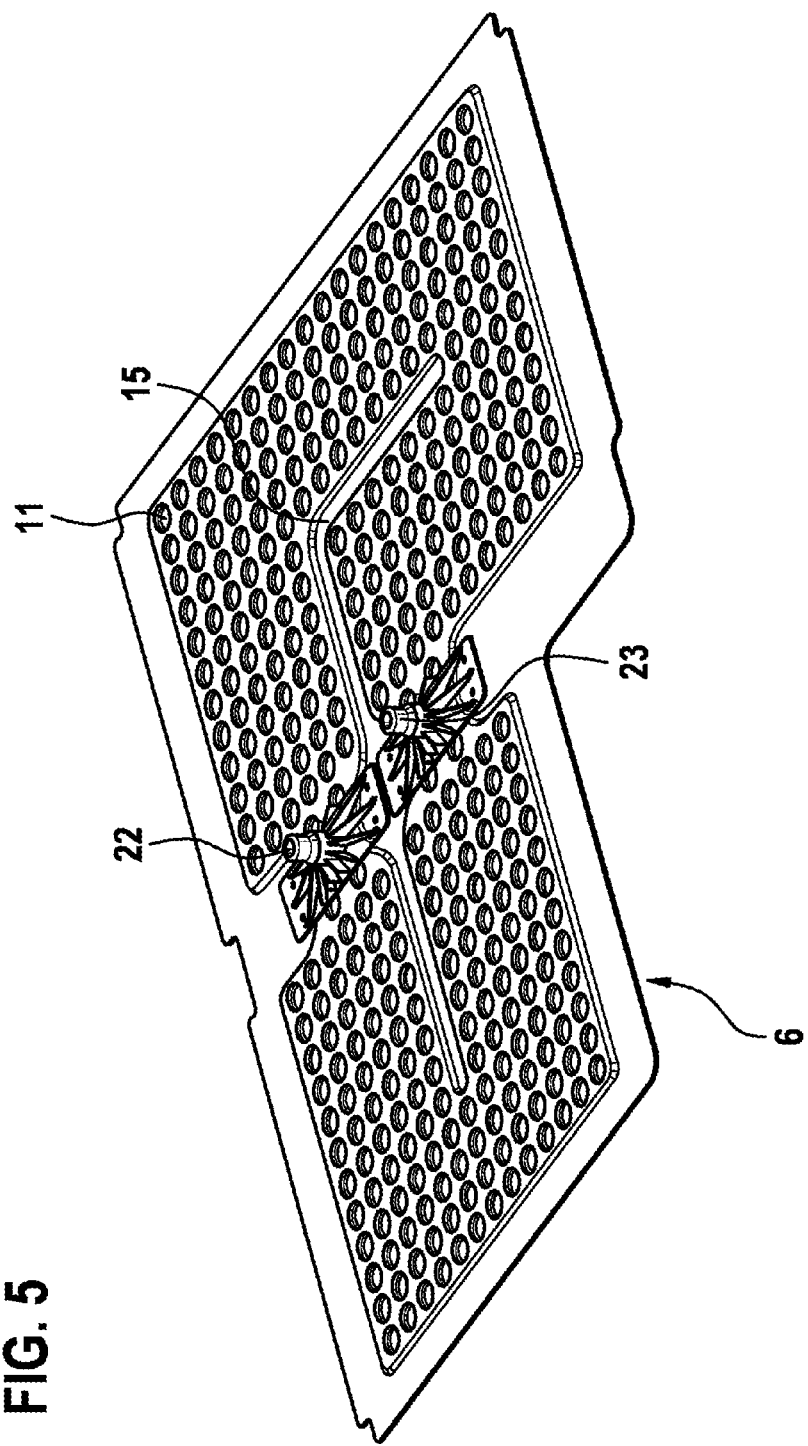

FIG. 5 shows a second tempering body 6 in a perspective view, wherein the side facing away from the flow chamber 4 of the temperature-controlling device 3 can be seen.

The tempering body 6 is configured such that this contains the spacer elements 11 and the flow deflection unit 15. The spacer elements 11 of the flow deflection unit 15 protrude from the plane of the base body and are thus arranged inside the flow chamber 4. Because of this formation, the spacer elements 11 and the flow deflection unit 15 are evident as depressions on the second tempering body 6. Such a formation may be achieved for example by means of a roll-bonding process.

FIG. 5 furthermore shows the first port 22 and the second port 23, which serve respectively for the inlet and outlet of tempering fluid into and from the flow chamber 4 and are arranged on the side of the second tempering body 6 facing away from the flow chamber.

Figure 6:
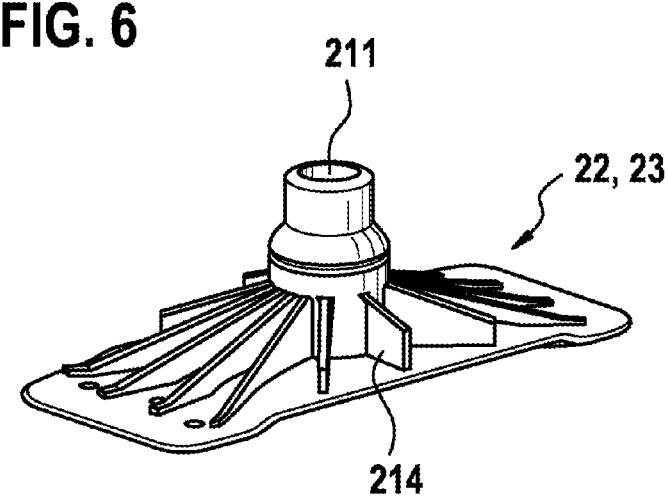
Figure 7:
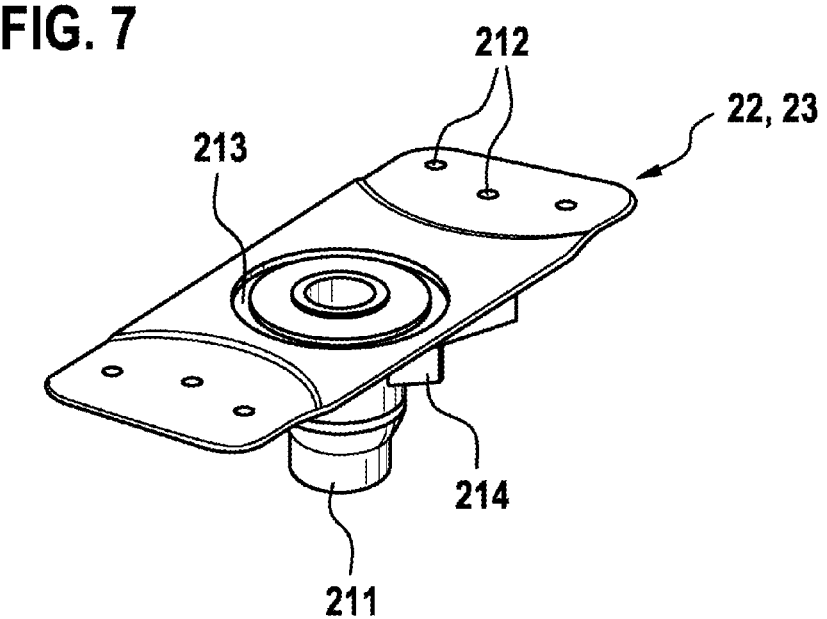

FIG. 6 and FIG. 7 show the first port 22 and the second port 23 in a first perspective view and second perspective view respectively. The first port 22 and second port 23 form a port element 211 which may be connected to a line carrying the tempering fluid and not shown in FIGS. 6 and 7.

Furthermore, the first port 22 and the second port 23 comprise means 212 which are configured to connect the respective port 22, 23 to the second tempering body 6. Furthermore, the port 22, 23 has at least one depression 213 in which a seal (not shown) may be arranged.

Furthermore, the port 22, 23 has ribs 214 arranged in a star shape to increase the mechanical stability.

Whereas it is advantageous to connect together the first tempering body 5 and second tempering body 6 by means of a roll-bonding process, in particular forming the spacer elements 11 and/or the flow deflection unit 15, it is advantageous to connect the first port 22 and the second port 23 in the second tempering body 6 by means of laser welding.

In a preferred embodiment of the temperature-controlling device 3 according to the invention, which is shown in particular in FIGS. 2 to 4, the spacer elements 11 advantageously have a diameter 261 of 15 mm or 16 mm, the isosceles triangle 27 advantageously has a shortest side of 29 mm or 30 mm, and the first surface 7 and second surface 8 advantageously have a spacing 12 of 2 mm or 2.5 mm. For these illustrated possibilities, when a tempering fluid flows through the flow chamber 4 from the first port 21 to the second port 23 at a volume flow of 500 l/h or 1200l/h, the numerically determined pressure losses of a temperature-controlling device 3 according to the invention can be reduced and the flow of the tempering fluid distributed evenly, wherein simultaneously the temperature-controlling device 3 has adequate mechanical stability against the loads occurring.

In particular, a temperature-controlling device 3 according to the first embodiment shown in FIG. 2 with a diameter 261 of 16 mm, with a shortest side of the isosceles triangle 27 of 30 mm, and with a spacing 12 of 2 mm, showed overall the lowest pressure loss and the best distribution of the flowing tempering fluid inside the flow chamber 4, in comparison with all simulated flow chambers 4.

Furthermore, with a temperature-controlling device 3 according to the second embodiment shown in FIG. 3 with a diameter 261 of 16 mm, with a shortest side of the isosceles triangle 27 of 30 mm, and with a distance 12 of 2 mm, the heat dissipation from the flow chamber 4 could be optimized.

The invention claimed is:

1. A battery module comprising
a temperature-controlling device comprising
    a flow chamber (4) which has a plurality of spacer elements (11) and is substantially closed, wherein the spacer elements (11) are arranged inside the flow chamber (4), and
    a flow deflection unit (15) arranged inside the flow chamber (4), with a longitudinal direction (16) extending along the flow deflection unit (15) from a first end (24) to a second end (25) of the flow deflection unit (15),
    wherein the flow deflection unit (15) forms a first side face (17) and a second side face (18) which are arranged in the longitudinal direction (16) on opposite sides of the flow deflection unit (15),
    wherein at least portions of the first side face (17) and the second side face (18) are arranged directly adjacent to one of the spacer elements (11, 111, 112),
    wherein the flow chamber (4) forms a first region (19) and a second region (20), in each of which a number of the spacer elements (11) are arranged, and
    wherein a first port (22) configured for inlet of tempering fluid into the flow chamber (4) and a second port (23) configured for outlet of tempering fluid from the flow chamber (4) are arranged between the first region (19) and the second region (20) of the flow chamber (4), and
at least one battery cell (2) arranged on a surface (13) of the temperature-controlling device (3) facing away from the flow chamber (4).

2. The battery module as claimed in claim 1,
further comprising a first tempering body (5) with a first surface (7), and a second tempering body (6) with a second surface (8), which are each formed substantially from a planar base body,
wherein the first surface (7) and the second surface (8) of the tempering bodies (5, 6) are spaced apart from each other by the plurality of spacer elements (11, 111, 112) so as to form the flow chamber (4), and wherein the spacer elements (11) each contact the first surface (7) and/or the second surface (8).

3. The battery module as claimed in claim 2, characterized in that the first tempering body (5) and/or the second tempering body (6) is formed from a metallic material or from plastic.

4. The battery module as claimed in claim 2, characterized in that one or both of the first tempering body (5) and the second tempering body (6) contains the plurality of spacer elements (11), wherein the spacer elements (11) each protrude from the plane of the planar base body of the one or both of the first tempering body and the second tempering body (5, 6).

5. The battery module as claimed in claim 2, characterized in that the spacer elements (11) are arranged inside the flow chamber (4), in a plane parallel to the first surface (7) and/or the second surface (8), and have a circular, quadrilateral, round, oval, elliptical or rectangular cross-sectional face (26).

6. The battery module as claimed in claim 2, characterized in that a cross-sectional face of the flow deflection unit (15) parallel to the first surface (7) and/or the second surface (8) has an asymmetrical form.

7. The battery module as claimed in claim 6, characterized in that the cross-sectional face (28) in the first region (19) has a first portion (281) and a second portion (282) arranged in an L shape to each other.

8. The battery module as claimed in claim 2, characterized in that the first surface (7) of the first tempering element (5) and the second surface (8) of the second tempering element (6) have a spacing of 1 mm to 5 mm.

9. The battery module as claimed in claim 2, characterized in that the first tempering body (5) and/or the second tempering body (6) is formed from aluminum.

10. The battery module as claimed in claim 2, characterized in that the spacer elements (11) are arranged inside the flow chamber (4), in a plane parallel to the first surface (7) and/or the second surface (8), and have a circular, quadrilateral, round, oval, elliptical or rectangular cross-sectional face (26), wherein a circular cross-sectional face (26) has a diameter (261) from 10 mm to 20 mm.

11. The battery module as claimed in claim 2, characterized in that a cross-sectional face of the flow deflection unit (15) parallel to the first surface (7) and/or the second surface (8) has an asymmetrical form, wherein the cross-sectional faces (28, 29) have a different form in the first region (19) and the second region (20).

12. The battery module as claimed in claim 11, characterized in that the cross-sectional face (29) in the second region (20) has a first portion (29, 291) which is I-shaped.

13. The battery module as claimed in claim 11, characterized in that the cross-sectional face (28) in the first region (19) has a first portion (281) and a second portion (282) arranged in a rounded L shape to each other, and the cross-sectional face (29) in the second region (20) has a first portion (29, 291) which is I-shaped, and furthermore has a second portion (292), and the first portion (291) and the second portion (292) are arranged in a T shape to each other.

14. The battery module as claimed in claim 1, characterized in that the spacer elements (11) are arranged in regular structures relative to each other, and in each case, three directly adjacent spacer elements (11) form an isosceles triangle (27).

15. The battery module as claimed in claim 1, characterized in that a surface (13) of the temperature-controlling device (3) facing away from the flow chamber (4) is flat.

16. The battery module as claimed in claim 1, further comprising a first tempering body (5) with a first surface (7), and a second tempering body (6) with a second surface (8), which are each formed substantially from a planar base body, wherein the first surface (7) and the second surface (8) of the tempering bodies (5, 6) are spaced apart from each other by the plurality of spacer elements (11, 111, 112) so as to form the flow chamber (4), and are arranged parallel to each other, and wherein the spacer elements (11) each contact the first surface (7) and/or the second surface (8), and are each connected to the first surface (7) and/or the second surface (8).

17. The battery module as claimed in claim 1, characterized in that the spacer elements (11) are arranged in regular structures relative to each other, and in each case, three directly adjacent spacer elements (11) form an isosceles triangle (27), wherein a shortest side of the isosceles triangle has a length of between 20 mm and 40 mm.

18. A method for manufacturing the battery module as claimed in claim 1, wherein in a first step, the spacer elements (11) are arranged on one of the tempering bodies (5, 6), or a tempering body (5, 6) is configured such that it contains the spacer elements (11), in a second step, the flow deflection unit (15) is arranged on one of the tempering bodies (5, 6), or a tempering body (5, 6) is configured such that it contains the flow deflection unit (15), and in a third step, the first tempering body (5) and the second tempering body (6) are connected together forming a substantially closed flow chamber (4), resulting in the battery module as claimed in claim 1.

19. A method for manufacturing the battery module as claimed in claim 1, wherein in a first step, the spacer elements (11) are arranged on one of the tempering bodies (5, 6), or a tempering body (5, 6) is configured such that it contains the spacer elements (11), in a second step, the flow deflection unit (15) is arranged on one of the tempering bodies (5, 6), or a tempering body (5, 6) is configured such that it contains the flow deflection unit (15), and in a third step, the first tempering body (5) and the second tempering body (6) are connected together forming a substantially closed flow chamber (4), wherein the connecting process is a roll-bonding process, resulting in the battery module as claimed in claim 1.

* * * * *